July 24, 1928.
A. KASTELIC
LEAD STORAGE BATTERY
Filed Jan. 28, 1926
1,678,224
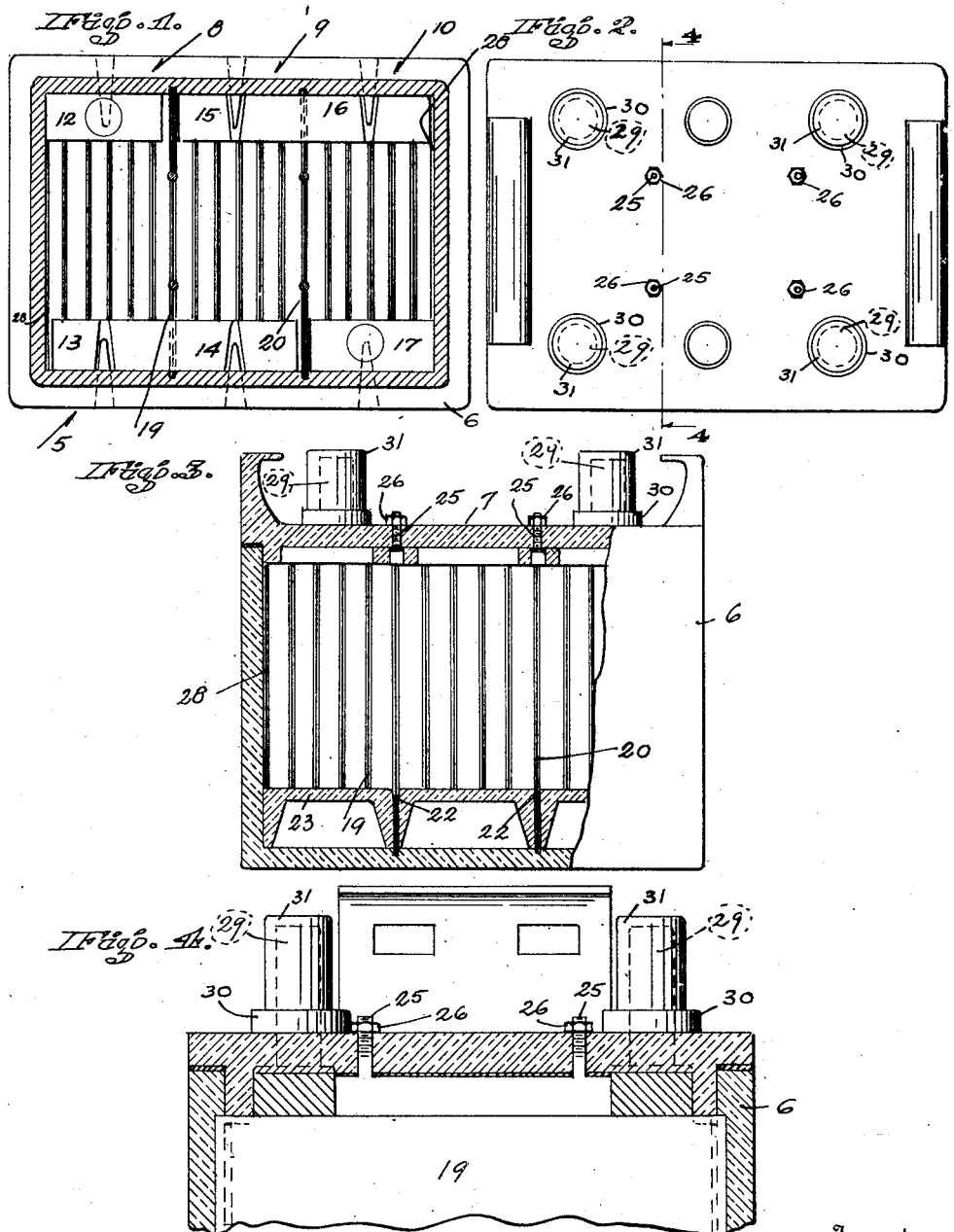
Inventor
ANTHONY KASTELIC
By
Attorneys.

Patented July 24, 1928.

1,678,224

UNITED STATES PATENT OFFICE.

ANTHONY KASTELIC, OF RICHMOND, CALIFORNIA.

LEAD STORAGE BATTERY.

Application filed January 28, 1926. Serial No. 84,469.

This invention relates to secondary batteries and more particularly it relates to lead storage batteries. An object of my invention is the provision of a battery having greater capacity for a given volume. Another object of my invention is the provision of a new construction for permanently sealing a battery. A still further object of my present invention is the provision of a battery of simple but strong and efficient construction.

With the foregoing objects in view, together with such other objects and advantages as may subsequently appear, this invention resides in the construction and arrangement of parts hereinafter described and claimed, and illustrated in the accompanying drawings, in which:

Figure 1 is a horizontal section through the battery of my invention;

Figure 2 is a plan view of the same;

Figure 3 is a side elevation of the same partly in section; and

Figure 4 is an end elevation with parts shown in section taken along the line 4—4 of Figure 2.

Referring to the drawings for a more detailed description thereof, the battery 5 comprises a container 6 having a cover 7. The battery comprises three cells, 8, 9 and 10 respectively, each consisting of the usual positive and negative plates separated in the usual manner by separators of any preferred or usual material and construction. A metal strip 12 connects together the negative plates of the cell 8, while the metal strip 13 connects together the positive plates of the cell 8. The strip 13 is integral with a strip 14 which connects together the negative plates of the cell 9. A strip 15 connects together the positive plates of the cell 9 and is integral with a strip 16 which connects together the negative plates of the cell 10. A strip 17 connects together the positive plates of the cell 10.

In lieu of the usual insulating partitions between the cells, I employ partitions of lead, these partitions being herein designated by the numerals 19 and 20, the former being between the cells 8 and 9 and the latter between the cells 9 and 10. Any usual or preferred separators are employed on both sides of these lead partitions.

The lead partition 19 is electrically connected to the strips 13 and 14. The strip 16, which is integral with the strip 15, is connected to the lead partition 20. The lead partitions 19 and 20 fit snugly into grooves 22 in the walls of the container, shown in Figure 3, and in grooves 22 in the bottom of the container. The partitions 19 and 20 thus function to separate the cells from each other, and also function as electrodes, one side of each being a positive electrode and the other side being negative. This double function of the partitions increases the electrical capacity of a battery having a given size.

The partitions 19 and 20 are provided at their tops with threaded projections 25 which extend through the cover 7 of the container. Nuts 26 are screwed on the projections 25, thus securing the partitions to the cover.

At the inner faces of the ends of the container are disposed lead sheets 28 which are electrically connected with the negative plates of the adjacent cells, namely cells 8 and 10.

The terminal posts 29 of the battery extend through the cover 7 of the container and are threaded to threadedly engage nuts 30. Sleeves 31 fit over the posts 29, their lower ends contacting with the upper surfaces of the nuts 30. The sleeves 31 are welded or burned to the posts 29 so as to securely lock the nuts 30.

While I have described one embodiment of my invention, modifications thereof may be readily devised without departing from the spirit of my invention, and it is to be understood that such modifications come within the scope of the appended claims.

I claim:

1. In a storage battery of the character described, a container having positive and negative plates arranged therein in alternating succession, lead partitions interposed between sets of plates and forming separate sections, and straps interconnecting plates of the same polarity in each section and plates of opposite polarity in adjacent sections, the said straps being electrically connected to the partitions separating adjacent sections.

2. In a storage battery of the character described, a container having positive and negative plates arranged therein in alternating succession, lead partitions interposed between sets of plates and forming separate sections, lead sheets disposed at the ends of the container, and straps interconnecting plates of the same polarity in each section and plates of opposite polarity in adjacent sections, the said straps being electrically connected to the lead sheets and partitions respectively.

ANTHONY KASTELIC.